Feb. 19, 1924.

J. B. WISE 1,484,314

REFRIGERATING BARREL

Filed June 6, 1923

Inventor
Joseph B. Wise
By E. H. Hond
Attorney

Feb. 19, 1924.

J. B. WISE 1,484,314

REFRIGERATING BARREL

Filed June 6, 1923

Inventor
Joseph B. Wise
By E. H. Bond
Attorney

Patented Feb. 19, 1924.

1,484,314

UNITED STATES PATENT OFFICE.

JOSEPH B. WISE, OF NEW YORK, N. Y.

REFRIGERATING BARREL.

Application filed June 6, 1923. Serial No. 643,698.

*To all whom it may concern:*

Be it known that I, JOSEPH B. WISE, a citizen of the United States, residing at New York, in the county of New York and State of New York, have invented certain new and useful Improvements in Refrigerating Barrels, of which the following is a specification.

This invention relates to certain new and useful improvements in refrigerating barrels, that shown in the present instance being designed more particularly for agitating and freezing substances in stick form, the material being contained in tubes or individual molds which are placed within the inner compartment or rotary member and subjected not only to the influence of the ice contained therein but to the influence of a liquid such as brine in the outer container or receptacle, and the brine kept under to and fro motions so that it coacts with the ice to quickly solidify the material in the tubes or molds. The construction is such that the inner receptacle is given a quarter revolution in one direction and then a similar movement in the opposite direction. I have found that in this way I produce a result that has not heretofore been attained, namely, I am enabled to solidify the material in stick form so hard that it will maintain its shape and solidity for many hours. I make a stick formed of water ice, ice cream or custard or the like and also of a beverage, that can be wrapped and eaten like a stick of candy, or sucked, and which will remain solid and hard even if exposed to the atmosphere for a great length of time, and which need not be packed in ice after it has been once formed. It is superfrozen, and all the surplus water removed, and the sticks in the mold are removed by a rammer or the like.

The present invention has for a further object to provide a device of this character which shall be cheap in its construction, yet durable and also efficient in use, reducing to a minimum the amount of ice required. It is composed of few parts, those readily assembled and not liable to get out of order.

Other objects and advantages of the invention will hereinafter appear, and the novel features thereof will be specifically defined by the appended claims.

The invention, in its preferred form, is clearly illustrated in the accompanying drawings, which, with the numerals of reference marked thereon, form a part of this specification, and in which—

Figure 5 is a perspective detail showing the means for limiting the revolution of the inner receptacle.

Like numerals of reference indicate like parts throughout the several views.

Figure 4:
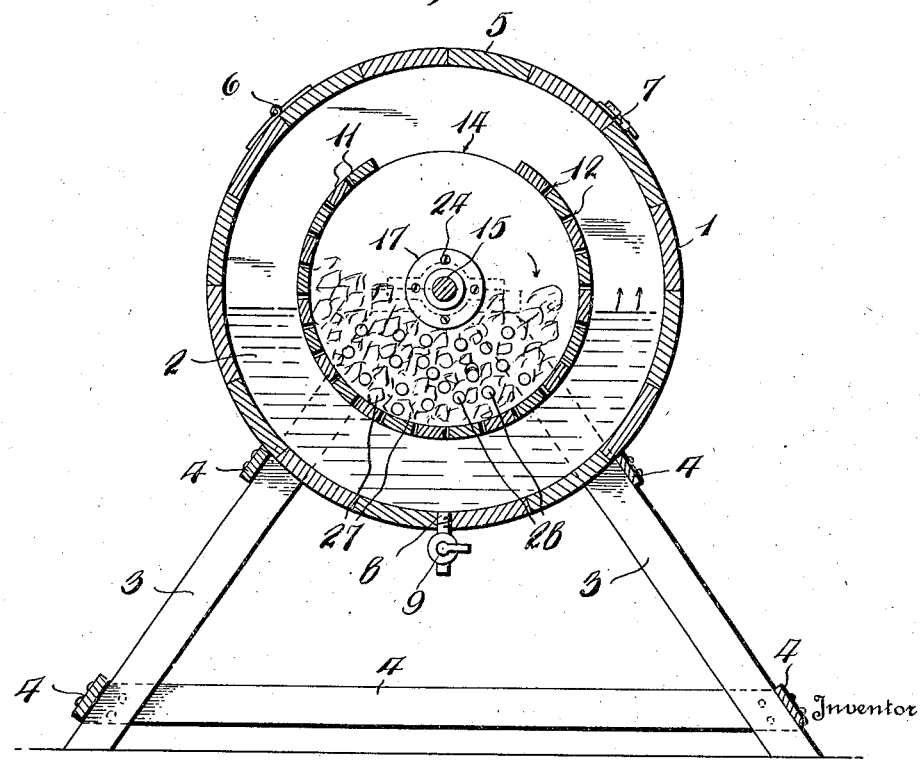
Figure 4 is a vertical cross section as on the line 4—4 of Figure 2, looking in the direction of the arrows.

Referring to the drawings 1 designates the outer receptacle, made water tight and adapted to contain brine or the like as seen at 2 in Figure 4. This outer receptacle is supported in any suitable manner in any desired position, in the present instance being shown as supported upon the trestle or the like 3, suitably braced by the braces 4, upon the upper ones of which the lower portion of the receptacle 1 rests and is immovably held as will be readily understood upon reference to Figures 1 and 4. The receptacle 1 is provided in its upper portion with a movable closure 5, in the present instance shown as hinged as at 6 and may be provided with a suitable means as shown at 7 for locking it in closed position.

The receptacle 1 is provided with a suitable outlet as seen at 8 controlled by a suitable cock or valve 9 whereby the brine may be withdrawn from the receptacle when desired.

Figure 1:
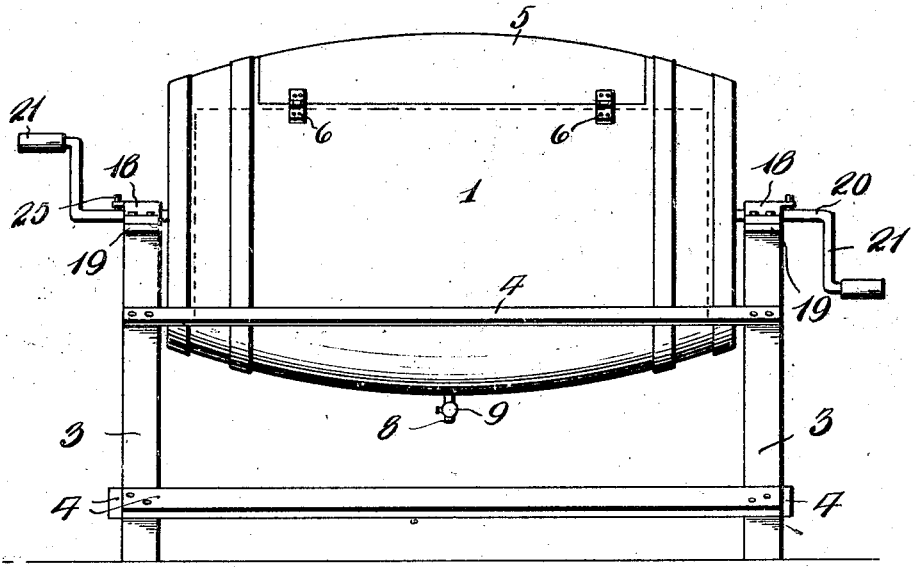
Figure 1 is a side elevation of a refrigerating barrel embodying my present invention.
Figure 2:
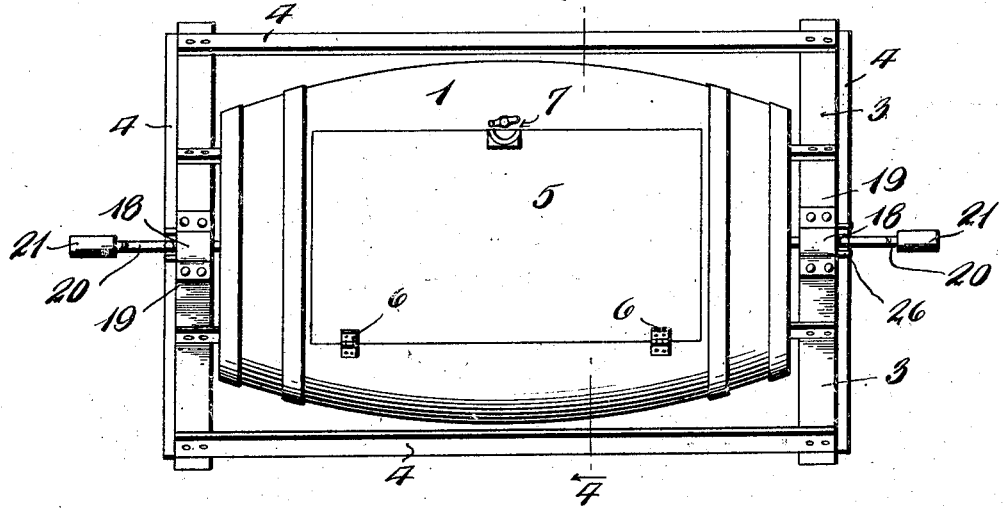
Figure 2 is a top plan thereof.

10 is the inner receptacle; it is composed in this instance of the heads and the longitudinal slats, the slats 11 being secured to the heads in any suitable manner and arranged at a distance apart so as to leave the passages 12 for the ready passage of the brine, the heads 13 being solid and disposed comparatively close to the heads of the outer receptacle as shown in Figure 1, so as to leave but a small space between the heads of the outer and inner receptacles so that the ice cannot accumulate therein and clog the motion of the inner receptacle. The inner receptacle is provided as shown in Figures 3 and 4 with an opening 14 for the introduction and removal of the ice and the tubes or molds which contain the substance to be frozen.

Figure 3:
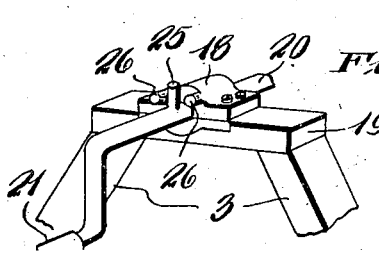
Figure 3 is a top plan of the inner receptacle removed.
Figure 3:
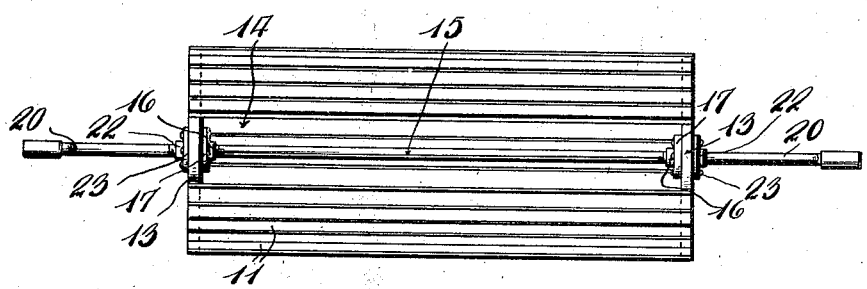

The heads 13 are sustained and braced by the rod 15 centrally disposed as seen in Figures 3 and 4 and its ends held in suitable sockets 16 on the flanged plates 17 secured by suitable means to the inner faces of the heads 13 as seen in Figures 3 and 4. This rod prevents buckling of the heads in either direction.

The inner receptacle is rotatably mounted within the outer receptacle. In the present instance I have shown bearings 18 on the upper members 19 of the trestle or support and in each of these bearings is mounted a shaft 20, having a crank handle 21, the inner end of each shaft being secured in a socket 22 on a flanged plate 23 secured to the outer faces of the heads 13, by the same means that secure the plates 17 in position upon the inner faces of the said heads 13, as seen clearly in Figure 3. In Figures 3 and 4 I have shown the said securing means as bolts 24.

In order that the inner receptacle may be limited in its revolution, preferably so that it shall make but substantially a quarter revolution in each direction and then be reversed, so as to prevent the discharge of the articles through the opening in the top of the inner receptacle into the outer container, I provide suitable means, in the present instance consisting of a pin or projection 25 on the shaft 20 movable between the pins or projections 26 on the bearing 18 as seen clearly in Figure 5. This, however, is but one of the various forms of means that may be employed for this purpose.

In practice, brine 2 of the proper quantity is placed in the outer receptacle. Ice, as seen at 27, is placed in the inner receptacle and the tubes or molds 28, filled with the material to be frozen into stick form placed in the inner receptacle in the ice, the cover 5 closed and then the inner receptacle is given motion to cause it to revolve a short distance in the one direction and then be reversed and revolved a short distance in the opposite direction. This alternate revolution causes the brine to be moved first in one direction and then in the other, the brine being swashed through the spaces between the slats of the inner receptacle, and out again. As the inner receptacle is revolved the brine is forced in one direction and the ice and molds carried in the opposite direction, and the relative directions of movement reversed upon reversal of the direction of rotation of the inner receptacle. This agitation causes a superfreezing of the material in the molds or tubes and in a very short space of time the material is so solidified that when the tubes are removed from the receptacle and the caps removed and the contents forced or rammed out they will be found to be in solid stick form and will so remain for hours. The molds in the present instance are in the form of tubes having removable caps for the open ends thereof, the molds being filled to overflow and one of the caps then forced on so as to provide sufficient compression to exclude the air and surplus water from the material within the tubes. They are then placed in the receptacle to be treated as hereinbefore described. The mode of removing the molds after the freezing will be readily understood.

Modifications in detail may be resorted to without departing from the spirit of the invention or sacrificing any of its advantages. The inner receptacle may be motor driven, or given its motion by means other than that shown.

What is claimed as new is:—

1. A confection stick freezing apparatus, comprising an outer horizontally extended closed container for the freezing mixture, an inner perforate container for the articles to be frozen horizontally disposed within and spaced from the walls of said outer container, said inner container having an upper peripheral opening, and means for oscillating said inner container about a horizontal axis to cause the agitation of the articles in said inner container, the oscillatory movement of said inner container being limited to prevent the discharge of articles through said opening into said outer container.

2. In a refrigerating barrel a receptacle composed of heads, slats connecting the heads and arranged spaced apart, flanged plates secured to the heads and having sockets, and a centrally-disposed rod joining said heads and supported in said sockets.

3. A refrigerating barrel comprising an outer receptacle, an inner reticulated receptacle having an opening in its upper wall, a support, shafts extended through the heads of the outer receptacle and secured to the heads of the inner receptacle, bearings for said shaft mounted on said support, and cooperating means on the shafts and bearings for limiting the revolution of the inner receptacle.

4. A refrigerating barrel comprising an outer receptacle, an inner receptacle, shafts connected with the heads of the latter, bearings for the shafts, means projecting from the bearings, and means on the shafts movable between said means to limit the revolution of the inner receptacle.

In testimony whereof I affix my signature.

JOSEPH B. WISE.